United States Patent
Kwak et al.

(10) Patent No.: US 11,371,335 B2
(45) Date of Patent: Jun. 28, 2022

(54) MAPPING A FRACTURE GEOMETRY

(71) Applicants: Saudi Arabian Oil Company, Dhahran (SA); King Fahd University of Petroleum and Minerals, Dhahran (SA)

(72) Inventors: Hyung Tae Kwak, Dhahran (SA); Mahmoud Elsayed, Dhahran (SA); Ammar El-Husseiny, Dhahran (SA); Mohamed Mahmoud, Dhahran (SA)

(73) Assignees: Saudi Arabian Oil Company, Dhahran (SA); King Fahd University of Petroleum & Minerals, Dhahran (SA)

( * ) Notice: Subject to any disclaimer, the term of this patent is extended or adjusted under 35 U.S.C. 154(b) by 0 days.

(21) Appl. No.: 17/002,267

(22) Filed: Aug. 25, 2020

(65) Prior Publication Data

US 2022/0065095 A1    Mar. 3, 2022

(51) Int. Cl.
*E21B 47/00*    (2012.01)
*E21B 49/02*    (2006.01)
(Continued)

(52) U.S. Cl.
CPC .......... *E21B 47/0025* (2020.05); *E21B 47/26* (2020.05); *E21B 43/26* (2013.01); *E21B 49/00* (2013.01)

(58) Field of Classification Search
CPC ...... E21B 41/0092; E21B 47/00; E21B 49/02; G01V 3/32
See application file for complete search history.

(56) References Cited

U.S. PATENT DOCUMENTS

| | | | |
|---|---|---|---|
| 6,856,132 B2 | 2/2005 | Appel et al. | |
| 8,583,410 B2 * | 11/2013 | Sisk | G01N 33/24 703/10 |

(Continued)

FOREIGN PATENT DOCUMENTS

| | | | |
|---|---|---|---|
| RU | 2292541 | 1/2007 | |
| WO | WO-2020167783 A1 * | 8/2020 | G01V 3/32 |

OTHER PUBLICATIONS

Cotts et al., "Pulsed field gradient stimulated echo methods for improved NMR diffusion measurements in heterogeneous systems," J. Magn. Reson., vol. 83, No. 2, pp. 252-266, Jun. 1989, 15 pages.

(Continued)

*Primary Examiner* — Kenneth L Thompson
(74) *Attorney, Agent, or Firm* — Fish & Richardson P.C.

(57) ABSTRACT

A fracture geometry mapping method includes determining a value of a diffusive tortuosity in a first direction in a first rock sample from a subterranean formation with one or more hardware processors; determining a value of a diffusive tortuosity in a second direction in the first rock sample from the subterranean formation with the one or more hardware processors, the second direction orthogonal to the first direction in the first rock sample; determining a value of a diffusive tortuosity in third direction in the first rock sample from the subterranean formation with the one or more hardware processors, the third direction orthogonal to both the first direction and the second direction in the first rock sample; comparing the values of the diffusive tortuosities in the in the first direction, the second direction, and the third direction; and based on the comparison, generating a first fracture network map of the subterranean formation, the first fracture network map including a first plurality of anisotropic fracture pathways.

21 Claims, 8 Drawing Sheets

(51) Int. Cl.
  *G01V 3/32* (2006.01)
  *E21B 47/002* (2012.01)
  *E21B 47/26* (2012.01)
  *E21B 49/00* (2006.01)
  *E21B 43/26* (2006.01)

(56) References Cited

U.S. PATENT DOCUMENTS

| | | | | |
|---|---|---|---|---|
| 8,725,477 | B2* | 5/2014 | Zhang | E21B 47/00 703/10 |
| 9,140,117 | B2* | 9/2015 | de Prisco | G06F 30/20 |
| 9,720,124 | B2 | 8/2017 | Viswanathan et al. | |
| 10,465,483 | B2* | 11/2019 | Andersen | G06F 17/18 |
| 2010/0237860 | A1 | 9/2010 | Hurlimann et al. | |
| 2011/0061860 | A1* | 3/2011 | Dean | G01V 99/005 166/250.01 |
| 2014/0076544 | A1* | 3/2014 | Lecerf | E21B 41/0092 166/250.01 |
| 2016/0215594 | A1* | 7/2016 | Hoeink | E21B 43/00 |
| 2017/0275970 | A1* | 9/2017 | Crawford | G01V 99/005 |
| 2018/0181692 | A1* | 6/2018 | Khudorozhkov | E21B 47/06 |
| 2019/0025460 | A1* | 1/2019 | Mustapha | G06F 30/20 |
| 2019/0195061 | A1* | 6/2019 | Ramsay | G01V 99/005 |
| 2019/0204248 | A1 | 7/2019 | Paulsen et al. | |

OTHER PUBLICATIONS

Dai et al. 2019. "Permeability Anisotropy and Relative Permeability in Sediments from the National Gas Hydrate Program Expedition 02, Offshore India." Marine and Petroleum Geology 108(Mar. 2018): 705-13. https://doi.org/10.1016/j.marpetgeo.2018.08.016, 40 pages.
Deng et al., "Investigation of directional hydraulic fracturing based on true tri-axial experiment and finite element modeling," Comput. Geotech., vol. 75, pp. 28-47, May 2016, 20 pages.
Engelke et al., "Three-dimensional pulsed field gradient NMR measurements of self-diffusion in anisotropic materials for energy storage applications," Phys. Chem. Chem. Phys., vol. 21, No. 8, pp. 4538-4546, 2019, 10 pages.
Fheed et al., "Fracture orientation and fluid flow direction recognition in carbonates using diffusion-weighted nuclear magnetic resonance imaging: An example from Permian," J. Appl. Geophys., vol. 174, p. 103964, Mar. 2020, 33 pages.
Appel et al., "Restricted Diffusion and Internal Field Gradients." SPWLA 40th Annual Logging Symposium: May 30-Jun. 3, 1999, 13 pages.
Furo et al., "NMR methods applied to anisotropic diffusion," Magn. Reson. Chem., vol. 40, No. 13, pp. S3-S14, Dec. 2002, 12 pages.
Ghanbarian et al., "Tortuosity in Porous Media: A Critical Review," Soil Sci. Soc. Am. J., vol. 77, No. 5, p. 1461, Sep. 2013, 19 pages.
Golsanami et al., "A review on the applications of the nuclear magnetic resonance (NMR) technology for investigating fractures," J. Appl. Geophys., vol. 133, pp. 30-38, 2016, 9 pages.
Hürlimann, "Effective Gradients in Porous Media Due to Susceptibility Differences." Journal of Magnetic Resonance 131(2): 232-40. http://www.sciencedirect.com/science/article/pii/S1090780798913647, 1998, 9 pages.
Johnson, "Diffusion ordered nuclear magnetic resonance spectroscopy: principles and applications," Prog. Nucl. Magn. Reson. Spectrosc., vol. 34, No. 3-4, pp. 203-256, May 1999, 54 pages.
Matteson et al., "NMR Relaxation of Clay-Brine Mixtures." In SPE Annual Technical Conference and Exhibition, New Orleans, Louisiana: Society of Petroleum Engineers, 7. https://doi.org/10.2118/49008-MS, Sep. 27-30, 1998, 7 pages.
mri-q.com (online), "Gradient Coils" retrieved from URL <http://mri-q.com/gradient-coils.html>, retrieved on Jun. 22, 2020, available on or before May 2020, 2 pages.
Peng et al., "Laboratory investigation of shale rock to identify fracture propagation in vertical direction to bedding," J. Geophys. Eng., vol. 15, No. 3, pp. 696-706, Jun. 2018, 18 pages.
Qiao et al., "Diffusion Correlation NMR Spectroscopic Study of Anisotropic Diffusion of Water in Plant Tissues," Biophys. J., vol. 89, No. 4, pp. 2899-2905, Oct. 2005, 7 pages.
Yang et al., "Quantitative Tortuosity Measurements of Carbonate Rocks Using Pulsed Field Gradient NMR," Transp. Porous Media, 130, 847-865, Sep. 2019, 19 pages.
Zhao et al., "Investigation of hydraulic fracturing behavior in heterogeneous laminated rock using a micromechanics-based numerical approach," Energies, vol. 12, No. 18, 2019, 24 pages.
Elsayed et al., "New Technique for Evaluating Fracture Geometry and Preferential Orientation Using Pulsed Field Gradient Nuclear Magnetic Resonance" SPE Journal, May 2021, 14 pages.
Sobieski et al., "The Path Tracking Method as an alternative for tortuosity determination in granular beds" Granular Matter 20.4, Nov. 2018, 14 pages.
PCT International Search Report and Written Opinion in International Appln. No. PCT/US2021/047568, dated Dec. 3, 2021, 16 pages.

* cited by examiner

MAPPING A FRACTURE GEOMETRY

TECHNICAL FIELD

This disclosure relates to mapping a fracture geometry and, more particularly, mapping a fracture geometry of a subterranean formation.

BACKGROUND

Formations of the Earth are filled with both liquid and gaseous phases of various fluids and chemicals including water, oils, and hydrocarbon gases. A wellbore in an oil and gas well extends from the surface of the Earth downward to geologic formations of the Earth. The wellbore conducts the fluids and chemicals from the formations of the Earth to the surface of the Earth through a tubular. Measurement tools can be placed in the wellbore.

SUMMARY

This disclosure describes techniques related to a method and a system of mapping a fracture geometry. The method includes determining a value of a diffusive tortuosity in a first direction in a sample. The method includes determining a value of a diffusive tortuosity in a second direction in the sample. The second direction is orthogonal to the first direction in the sample. The method includes determining a value of a diffusive tortuosity in third direction in the sample. The third direction is orthogonal to both the first direction and the second direction in the sample. The method includes comparing the values of the diffusive tortuosities in the in the first direction, the second direction, and the third direction. The method includes, based on the comparison, generating a fracture network map of the sample. The fracture network map portrays anisotropic fracture pathways of the sample.

In an example implementation, a fracture geometry mapping method includes determining a value of a diffusive tortuosity in a first direction in a first rock sample from a subterranean formation with one or more hardware processors; determining a value of a diffusive tortuosity in a second direction in the first rock sample from the subterranean formation with the one or more hardware processors, the second direction orthogonal to the first direction in the first rock sample; determining a value of a diffusive tortuosity in third direction in the first rock sample from the subterranean formation with the one or more hardware processors, the third direction orthogonal to both the first direction and the second direction in the first rock sample; comparing the values of the diffusive tortuosities in the in the first direction, the second direction, and the third direction; and based on the comparison, generating a first fracture network map of the subterranean formation, the first fracture network map including a first plurality of anisotropic fracture pathways.

In an aspect combinable with the example implementation, the diffusive tortuosity includes a ratio of a free self-diffusion coefficient of bulk fluid to a restricted effective self-diffusion coefficient of a fluid in a porous media.

In another aspect combinable with any of the previous aspects, each of the first plurality of anisotropic fracture pathways includes a pathway length; and a pathway connection.

In another aspect combinable with any of the previous aspects, determining the values of the diffusive tortuosities in the first direction, the second direction, and the third direction further includes generating a pulsed field gradient nuclear magnetic resonance signal in the first direction, the second direction, and the third direction.

In another aspect combinable with any of the previous aspects, the pulsed field gradient nuclear magnetic resonance signal includes a 13-interval bi-polar pulsed field gradient stimulated echo.

Another aspect combinable with any of the previous aspects further includes generating the pulsed field gradient nuclear magnetic resonance signal by a logging tool coupled to a downhole conveyance disposed in the subterranean formation.

In another aspect combinable with any of the previous aspects, the downhole conveyance includes a wireline.

Another aspect combinable with any of the previous aspects further includes, based on the first fracture network map of the subterranean formation, determining a preferential fracture direction for hydraulic fracturing the subterranean formation.

Another aspect combinable with any of the previous aspects further includes determining a value of a second diffusive tortuosity in a first direction in a second rock sample from the subterranean formation with the one or more hardware processors.

In another aspect combinable with any of the previous aspects, the first rock sample is sampled a first depth from a surface of the Earth, and the second rock sample is sampled at a second depth from the surface of the Earth different that the first depth.

Another aspect combinable with any of the previous aspects further includes determining a value of a second diffusive tortuosity in a second direction in the second rock sample from the subterranean formation with the one or more hardware processors that is orthogonal to the first direction in the second rock sample.

Another aspect combinable with any of the previous aspects further includes determining a value of a second diffusive tortuosity in third direction in the second rock sample from the subterranean formation with the one or more hardware processors that is orthogonal to both the first direction and the second direction in the second rock sample.

Another aspect combinable with any of the previous aspects further includes comparing the values of the second diffusive tortuosities in the in the first direction, the second direction, and the third direction.

Another aspect combinable with any of the previous aspects further includes, based on the comparison, generating a second fracture network map of the subterranean formation at the second depth that includes a second plurality of anisotropic fracture pathways.

Another aspect combinable with any of the previous aspects further includes, based on the first fracture network map and the second fracture network map, generating a multi-stage fracturing scheme that includes a plurality of preferential fracture directions.

In another aspect combinable with any of the previous aspects, each preferential fracture direction is at a different depth than the previous preferential fracture direction.

Another aspect combinable with any of the previous aspects further includes, based on the first fracture network map of the subterranean formation, predicating a water influx direction and water influx rate of water influx into the subterranean formation.

In another example implementation, a system includes one or more computer processors; and at least one non-transitory computer-readable storage medium that stores instructions executable by the one or more computer processors to cause the one or more computer processors to perform operations. The operations include identifying a signal representing a value of a diffusive tortuosity in a first direction in a first rock sample from a subterranean formation; identifying a signal representing a value of a diffusive tortuosity in a second direction in the first rock sample from the subterranean formation, the second direction orthogonal to the first direction in the first rock sample; identifying a signal representing a value of a diffusive tortuosity in third direction in the first rock sample from the subterranean formation, the third direction orthogonal to both the first direction and the second direction in the first rock sample; comparing the values of the diffusive tortuosities in the in the first direction, the second direction, and the third direction; and based on the comparison, generating a first fracture network map of the subterranean formation, the first fracture network map including a first plurality of anisotropic fracture pathways.

An aspect combinable with the example implementation further includes a pulsed field gradient nuclear magnetic resonance tool configured to perform operations.

In another aspect combinable with any of the previous aspects, the operations include generating the signal representing a value of a diffusive tortuosity in a first direction in the first rock sample from the subterranean formation.

In another aspect combinable with any of the previous aspects, the operations include transmitting the signal representing the value of the diffusive tortuosity in the first direction to the one or more computer processors.

In another aspect combinable with any of the previous aspects, the operations include generating the signal representing the value of the diffusive tortuosity in the second direction in the first rock sample.

In another aspect combinable with any of the previous aspects, the operations include transmitting the signal representing the value of a diffusive tortuosity in a second direction to the one or more computer processors.

In another aspect combinable with any of the previous aspects, the operations include generating the signal representing the value of the diffusive tortuosity in third direction in the first rock sample.

In another aspect combinable with any of the previous aspects, the operations include transmitting the signal representing the value of the diffusive tortuosity in the second direction to the one or more computer processors.

In another aspect combinable with any of the previous aspects, the diffusive tortuosity includes a ratio of a free self-diffusion coefficient of bulk fluid to a restricted effective self-diffusion coefficient of a fluid in a porous media.

In another aspect combinable with any of the previous aspects, each of the first plurality of anisotropic fracture pathways includes a pathway length; and a pathway connection.

In another aspect combinable with any of the previous aspects, the operation of determining the values of the diffusive tortuosities in the first direction, the second direction, and the third direction further includes generating a pulsed field gradient nuclear magnetic resonance signal in the first direction, the second direction, and the third direction.

In another aspect combinable with any of the previous aspects, the pulsed field gradient nuclear magnetic resonance tool is configured to generate a 13-interval bi-polar pulsed field gradient stimulated echo signal.

In another aspect combinable with any of the previous aspects, the pulsed field gradient nuclear magnetic resonance tool is coupled to a downhole conveyance disposed in the subterranean formation and configured to generate a pulsed field gradient nuclear magnetic resonance signal.

In another aspect combinable with any of the previous aspects, the downhole conveyance includes a wireline.

In another aspect combinable with any of the previous aspects, the operations further include, based on the first fracture network map of the subterranean formation, further determining a preferential fracture direction for hydraulic fracturing the subterranean formation.

In another aspect combinable with any of the previous aspects, the operations further include identifying a value of a second diffusive tortuosity in a first direction in a second rock sample from the subterranean formation.

In another aspect combinable with any of the previous aspects, the first rock sample is sampled a first depth from a surface of the Earth, and the second rock sample is sampled at a second depth from the surface of the Earth different that the first depth.

In another aspect combinable with any of the previous aspects, the operations further include identifying a value of a second diffusive tortuosity in a second direction in the second rock sample from the subterranean formation that is orthogonal to the first direction in the second rock sample.

In another aspect combinable with any of the previous aspects, the operations further include identifying a value of a second diffusive tortuosity in third direction in the second rock sample from the subterranean formation that is orthogonal to both the first direction and the second direction in the second rock sample.

In another aspect combinable with any of the previous aspects, the operations further include comparing the values of the second diffusive tortuosities in the in the first direction, the second direction, and the third direction.

In another aspect combinable with any of the previous aspects, the operations further include based on the comparison, generating a second fracture network map of the subterranean formation at the second depth that includes a second plurality of anisotropic fracture pathways.

In another aspect combinable with any of the previous aspects, the operations further include, based on the first fracture network map and the second fracture network map, generating a multi-stage fracturing scheme that includes a plurality of preferential fracture directions.

In another aspect combinable with any of the previous aspects, each preferential fracture direction is at a different depth than the previous preferential fracture direction.

In another aspect combinable with any of the previous aspects, the operations further include the operations further include, based on the first fracture network map of the subterranean formation, further predicating a water influx direction and water influx rate of water influx into the subterranean formation Example implementations of mapping a fracture geometry according to the present disclosure may include one, some, or all of the following features. For example, mapping a fracture geometry according to the present disclosure may increase the quantity of data collected regarding a sample from one sampling evolution. Specifically, fracture tortuosity and fracture orientation may be collected from a sample. These data may be collected in combination with other data regarding the sample, for instance, during a single wellbore logging evolution. Additional data, for instance, a surface to volume ratio, an anisotropic permeability, or a fluid diffusion coefficient may be measured and/or calculated. These data may be used to more accurately determine the in situ stresses of a subterranean formation. As another example, mapping a fracture geometry according to the present disclosure may improve the quality and accuracy of hydraulic fracturing simulation modeling of a subterranean formation. In situ stresses of the subterranean formation can be a crucial input to hydraulic fracturing simulation modeling. As yet a further example, mapping a fracture geometry according to the present disclosure may provide useful data after the completion of a hydraulic fracturing operation in a subterranean formation. Some methods for measuring in situ stresses of a subterranean formation, for instance, a micro-seismic method which measures micro-seismic waves produced from hydraulic fracturing a formation, only generate in situ stress data during the hydraulic fracturing evolution. Errors associated with the micro-seismic method may be avoided. Micro-seismic methods may have a high background noise level and an uncertainty associated with inversion process to locate and map the events. As another example, mapping a fracture geometry according to the present disclosure may improve the accuracy and the quality of the data collected regarding a sample. A sample of the subterranean formation may be measured intact in the wellbore, and not have to be removed, for instance, by a coring tool. The physical integrity and robustness of the sample of the subterranean formation may be improved by measuring the sample properties by non-destructive means. Additionally, the sample of the subterranean formation may be measured in a laboratory with the sample exposed to the same reservoir pressure and temperature to simulate an in situ condition. As a further example, mapping a fracture geometry according to the present disclosure may increase the numbers of samples that may be measure. Some measurement methods may be limited in the sample size or the sample shape that may be measure, for instance when using a micro-computed tomography scan which requires sub-plugs for high resolution imaging. The sub-plug sample might not be representative larger subterranean formation and the results only applicable to small localized area. Additionally, micro-computed tomography scan techniques are time consuming and limited to laboratory investigation. As another example, mapping a fracture geometry according to the present disclosure may be achieved with using existing nuclear magnetic resonance logging tools.

The details of one or more implementations of the subject matter described in this disclosure are set forth in the accompanying drawings and the description. Other features, aspects, and advantages of the subject matter will become apparent from the description, the drawings, and the claims.

DETAILED DESCRIPTION

Figure 1:
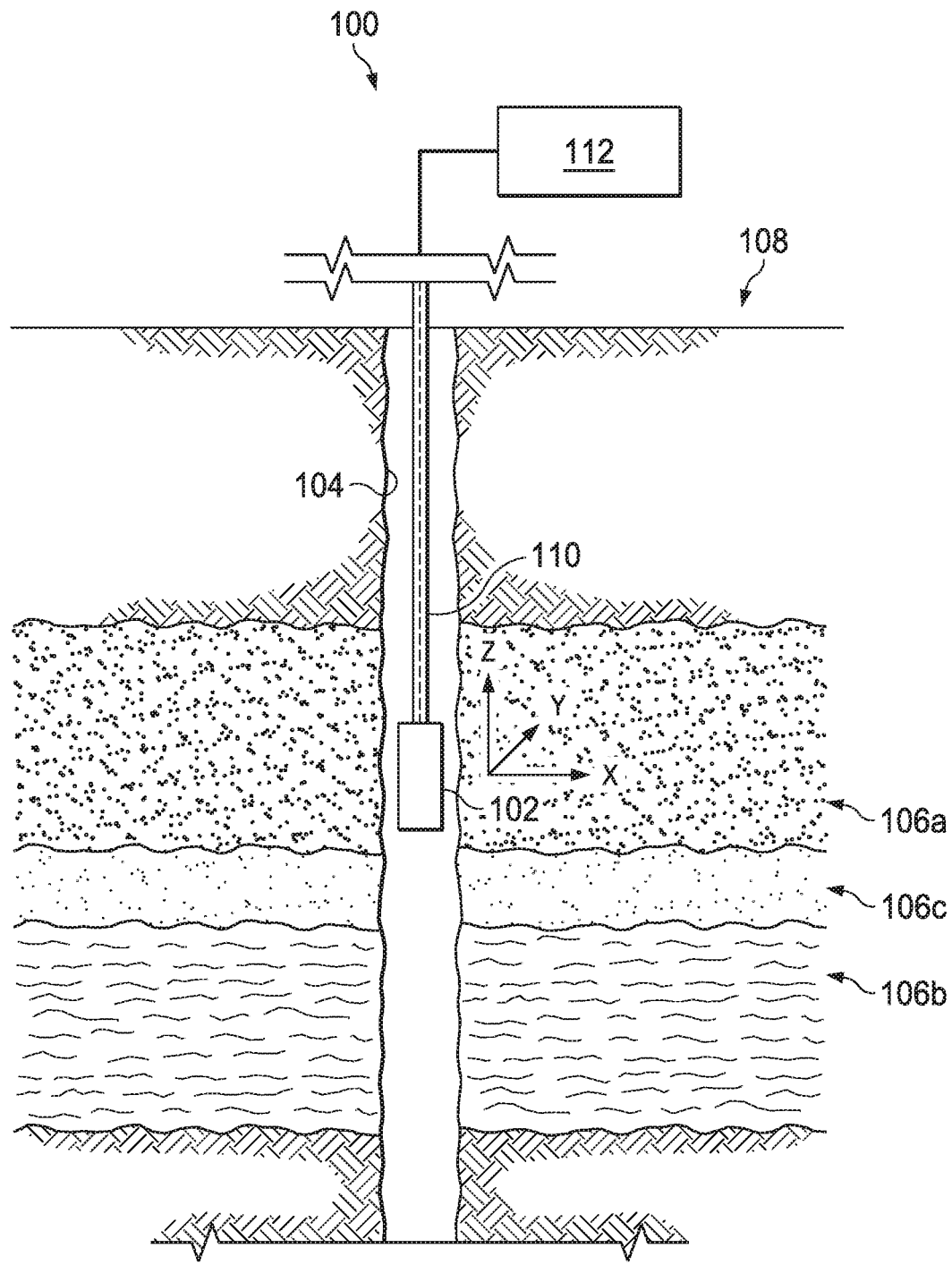
FIG. 1 is a schematic view of a fracture geometry mapping system disposed in a wellbore.

FIG. 1 is a schematic view of an example fracture geometry mapping system 100 including a downhole tool 102 disposed in a wellbore. Generally, FIG. 1 illustrates a portion of one embodiment of a fracture geometry mapping system 100 according to the present disclosure in which the downhole tool 102 may be run into a wellbore 104 and operated when the downhole tool 102 reaches a particular location within the wellbore 104. The downhole tool 102, in some aspects, includes a logging tool to sequentially transmit a series of signals into a subterranean formation 106 while stationary in the wellbore 104. In some aspects, the logging tool is a pulsed field gradient nuclear magnetic resonance tool. The series of signals transmit from the downhole tool 102 in an x-direction, a y-direction, and a z-direction into the subterranean formation 106a.

In some aspects, the signals are a pulsed field gradient nuclear magnetic resonance signal. The pulsed field gradient distorts an intrinsic magnetic field of the sample by causing a resonance frequency variation in the protons of the sample based on the proton's positions. The movement of the molecules will be directed in the y-direction of the sample which gives an indication of the diffusive tortuosity in the y-direction of the sample. On the other hand, if the x-direction gradient is applied the movement of the molecules will be directed in the x-direction. The pulsed field gradient is removed and the induced magnetic field begins to decay to reach the intrinsic magnetic field state. These changes of direction and strength of the magnetic field is measured. The measurements are performed separately in each direction in order to have a single value of diffusion in each direction. The diffusive tortuosity is then calculated by using the data at a diffusion time that is large enough to reach a long-term asymptotic state.

As shown in FIG. 1, the fracture geometry mapping system 100 accesses the subterranean formation 106a and a second subterranean formation 106b through the wellbore 104. The subterranean formation 106a or 106b may be filled with both liquid and gaseous phases of various fluids and chemicals including water, oils, and hydrocarbon gases. The wellbore 104 may be an oil and gas well which extends from the surface 108 of the Earth downward to the subterranean formations 106 of the Earth. The wellbore 104 is fluidly coupled to the subterranean formation 106 of the Earth. The wellbore 104 conducts the fluids and chemicals from the subterranean formations 106 of the Earth to the surface 108 of the Earth through a tubular. For example, a pipe disposed within the wellbore 104 may conduct the fluids and chemicals.

The subterranean formations 106 have pathways through which the fluids and chemicals may flow. The pathways may be referred to fracture pathways or anisotropic fracture pathways. Fracture pathways have a length and a degree of connectivity (the ability of a fluid to flow or diffuse through the fracture pathway). Some of the pathways are naturally occurring fractures. Other fractures may be artificially induced. For example, a fracture maybe induced in the subterranean formation 106 by increasing the pressure above a pore pressure to rupture pores in the subterranean formation 106 containing fluid. This process is hydraulic fracturing. Other fractures may be induced by injecting an acid to etch pathways into the subterranean formation. This process is acid fracturing. The flow of fluids and chemicals through these pathways may occur by diffusion as opposed to a bulk fluid flow. Diffusion may usually be uniform in every direction, for example, most liquids and homogeneous solid materials such as gels. Such materials are referred to as isotropic and have a single diffusion coefficient (D). The subterranean formation has a single free self-diffusion coefficient of bulk fluid (Do). The free self-diffusion coefficient of bulk fluid, Do, is the intrinsic diffusion coefficient of the bulk fluid. A magnetic field gradient of magnitude "g" is applied for a time "δ" to provide the orientation of the electrons in the molecules (the spins) with a phase shift proportional to their initial position. After a diffusion time "Δ", a second gradient of equal duration but amplitude "−g" is applied to remove the phase shift. If the orientations of the electrons in the molecules (the spins) have not moved, their net phase shift is zero.

On the other hand, the reservoir rocks (rocks containing fluids and chemicals) can be highly heterogeneous and have different coefficients of diffusion in different directions, especially in presence of fractures. Therefore, the subterranean formation may also have a restricted diffusion coefficient of fluid in the porous media ($D_r$) in different directions. The ratio of the single free self-diffusion coefficient of bulk fluid ($D_0$) to the restricted diffusion coefficient of fluid in the porous media ($D_r$) is diffusive tortuosity:

$$\tau_d = D_0/D_r \quad (1)$$

When the restricted diffusion coefficient of fluid is calculated in each direction, the diffusive tortuosity in each direction may then be generated. The fracture geometry connectivity is strongly related to the diffusion tortuosity, Td, in different directions within the subterranean formation 106. The fluids and chemicals in the subterranean formation have an intrinsic magnetic field based on the overall strength and orientation of the atoms and molecules.

The downhole tool 102 is mechanically coupled to a downhole conveyance 110 disposed in the subterranean formation 106a. In some aspects, the downhole conveyance 110 is a drilling assembly (not shown). The drilling assembly may include a drill bit to remove portions of the subterranean formations 106a, 106b, and 106c to create the wellbore 104. The downhole tool 102 may be included as a logging while drilling (LWD) tool (not shown). The LWD tool coupled to the drilling assembly allows the measuring operation to occur either during drilling or during a pause in the drilling without necessitating removing the downhole conveyance 110 (the drilling assembly) from the wellbore 104. In other aspects, the downhole conveyance 110 may be a wireline assembly as shown in FIG. 1. A wireline assembly can be disposed in the wellbore 104 following the completion of the drilling process for the wellbore 110 depth, after the drilling assembly has been removed from the wellbore 104. The wireline assembly can transfer data including command signals to and from the downhole tool 102 from a control system 112 on the surface 108 of the Earth. The downhole tool 102 may be operated when the downhole tool 102 reaches a particular location within the wellbore 104 or the logging tool may be operated continuously.

In some aspects, the downhole tool 102 is a pulsed field gradient nuclear magnetic resonance tool. The pulsed field gradient nuclear magnetic resonance tool transmits a timed pulse with a spatial-dependent field frequency to generate the magnetic field gradient. The magnetic field gradient may be defined by four characteristics. The first characteristic is the axis in which the gradient is applied. The second characteristic is the strength of the gradient. The third characteristic is the shape of the applied gradient. The fourth characteristic is the duration of the gradient application. The series of signals transmit from the downhole tool 102 in an x-direction, a y-direction, and a z-direction into the subterranean formation 106a sample. The pulsed field gradient distorts an intrinsic magnetic field of the sample by causing a resonance frequency variation in the protons of the sample based on the proton's positions.

Figure 2A:
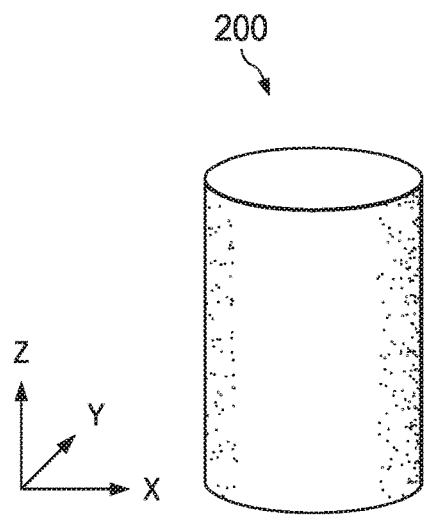
FIG. 2A is a schematic view of a rock sample from a subterranean formation.
Figure 2B:
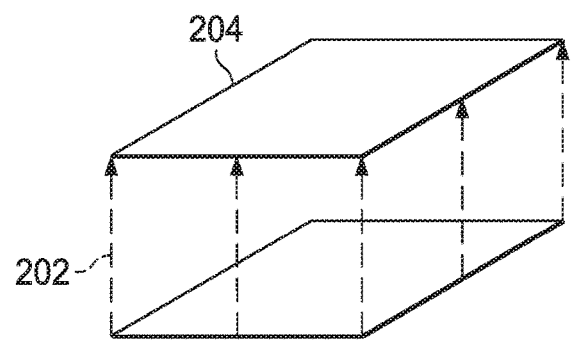
FIG. 2B is a schematic view of magnetic field in a substance with no nuclear magnetic resonance gradient applied.
Figure 2C:
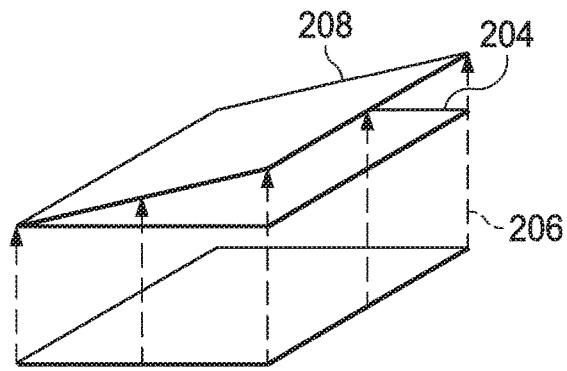
FIG. 2C is a schematic view of a nuclear magnetic resonance gradient applied in an x-direction in a substance.
Figure 2D:
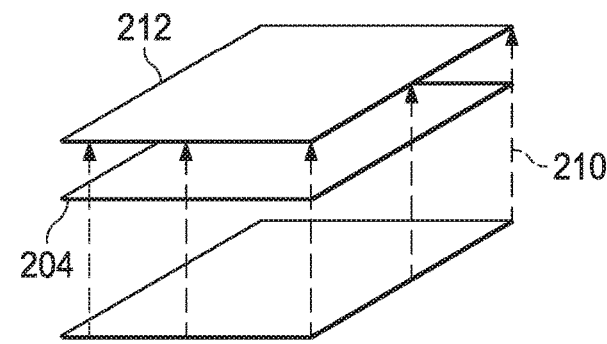
FIG. 2D is a schematic view of a nuclear magnetic resonance gradient applied in an z-direction in a substance

FIGS. 2A-2D show a sample and various magnetic field responses to the pulsed field gradient. Referring to FIG. 2A, a sample 200 of a subterranean formation 106a is show. The sample is cylindrical. A three axis coordinate system is shown. The x-axis is along a circular cross section of the cylinder. The y-axis is also along the circular cross-section, perpendicular to the x-axis. The z-axis is perpendicular to both the x-axis and the y-axis, extending the length of the cylinder. FIG. 2B shows a representation of the intrinsic magnetic field 202 (shown by arrows) of the sample 200. The arrows show the direction and the strength (shown by the relative arrow length) of the intrinsic magnetic field 202. The planar surface 204 at the point of the arrows representing the intrinsic magnetic field 202 illustrates the orientation of the intrinsic magnetic field. FIG. 2C shows the resultant magnetic field 206 of the sample 200 after a pulsed field gradient has been applied in the x-direction. A slight change in the magnetic field strength and orientation is shown by the increased length of the arrows representing the resultant magnetic field 206 and the orientation of the planar surface 208 compared to the planar surface 204 of FIG. 2B. FIG. 2D shows the resultant magnetic field 206 of the sample 200 after a pulsed field gradient has been applied in the z-direction. A large and even change in the magnetic field strength and orientation is shown by the even and increased length of the arrows representing the resultant magnetic field 210 and the orientation of the planar surface 212 compared to the planar surface 204 of FIG. 2B. The restricted diffusion in the x-direction (by applying magnetic gradient in the specified direction), and it is found to be less than the restricted diffusion in the z-direction. This means that molecules experienced more tortuous pathways in the z-direction, while in the x-direction molecules found more freedom to diffuse (less tortuous).

The strength of the gradient field (S) is measured in a single direction at a time. The signal attenuation is show by Equation 2, where $S_o$ is the nuclear magnetic resonance signal in the absence of applied magnetic field gradients, as measured in microvolts (μVolt). $D_R$, discussed previously, is the restricted self-diffusion coefficient of the fluid in meters squared per second (m²/s), Delta (Δ) is the duration between two applied magnetic fields (separation time), the diffusion time, in milliseconds (msec). δ is the duration of the applied magnetic field gradient (the pulse width) (msec). $\delta_1$ and $\delta_2$ are the pre- and post-pulse time, respectively. $\gamma$ is the gyromagnetic ratio of the nucleus being studied ($2.68 \times 10^8$ Hz/Tesla for $^1$H nucleus). The strength of the applied magnetic field gradient ($g_a$) is in Teslas per meter (T/m). The strength of the internal magnetic field gradient ($g_o$) is in Teslas per meter (T/m). The time between the first two ($\pi/2$) nuclear magnetic resonance pulses X is in milliseconds.

$$\frac{S}{S_0} = \exp\left\{-D_R \gamma^2 \left[\delta^2\left(4\Delta + 6\lambda - \frac{2\delta}{3}\right)g_a^2 + 2\lambda\delta(\delta_1 - \delta_2)g_a g_0 + \frac{4}{3}\lambda^3 g_0^2\right]\right\} \quad (2)$$

By choosing the same value for the two time periods $\delta_1$ and $\delta_2$ and selecting diffusion time larger than the time between the first two nuclear magnetic resonance pulses, Equation 1 can be expressed as Equation 3, enabling the restricted diffusion coefficient of fluid in the porous media ($D_r$) to be calculated from the slope of the natural logarithm of the signal attenuation versus b', where Equation 4 shows b'.

$$\frac{S}{S_0} = \exp\left\{-D_R \gamma^2 \left[\delta^2\left(4\Delta + 6\lambda - \frac{2\delta}{3}\right)g_a^2\right]\right\} = \quad (3)$$

$$\exp\left(-D_R(2\delta\gamma g_a)^2 \left(\Delta - \frac{3}{2}\lambda - \frac{\delta}{6}\right)\right)$$

$$b' = (2\delta\gamma g_a)^2 \left(\Delta - \frac{3}{2}\lambda - \frac{\delta}{6}\right) \quad (4)$$

The signal attenuation ($S/S_o$) is measured in each of the x-direction, the y-direction, and the z-direction into the subterranean formation 106a and the restricted diffusion coefficient of fluid in the porous media ($D_r$) is then calculated using the previously described method. The diffusive tortuosity in each of the x-direction, the y-direction, and the z-direction the subterranean formation 106a are then calculated from Equation 2. The downhole tool 102 may perform the previously described calculations and transmit a signal representing the diffusive tortuosities in the x-direction, the y-direction, and the z-direction to the control system 112. The downhole tool 102 may store the data for calculation at a later time.

Alternatively, the downhole tool 102 may transmit a signal or signals representing strength of the gradient field (S), the nuclear magnetic resonance signal in the absence of applied magnetic field gradients ($S_o$), the duration between two applied magnetic fields ($\Delta$), the duration of the applied magnetic field gradient ($\delta$), the pre-pulse time ($\delta_1$), the post-pulse time ($\delta_2$), the gyromagnetic ratio of the nucleus being studied ($\gamma$), the strength of the applied magnetic field gradient ($g_a$), the strength of the internal magnetic field gradient ($g_o$), and the time between the first two ($\pi/2$) nuclear magnetic resonance pulses X to the control system 112 in each of the x-direction, the y-direction, and the z-direction. The processor may then perform the previously described calculations to determine the diffusive tortuosity in the x-direction, the y-direction, and the z-direction.

The measurements may be performed at multiple locations. For example, a measurement may be performed at multiple depths within subterranean formation 106a. A single measurement may be performed in each of the subterranean formations 106a and 106b. Multiple measurements may be performed in each of the subterranean formations 106a and 106b.

Figure 10A:
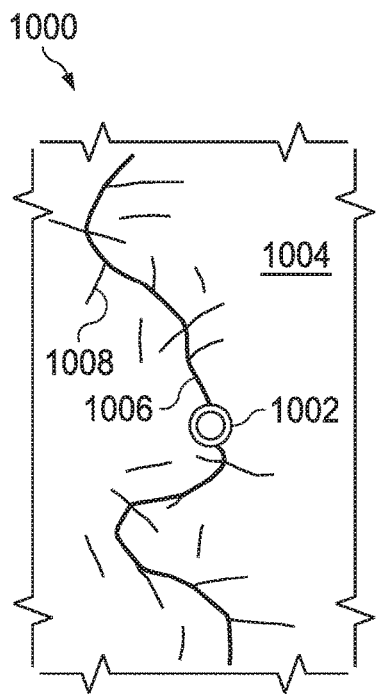
FIG. 10A is a schematic view of a fracture network map.
Figure 10B:
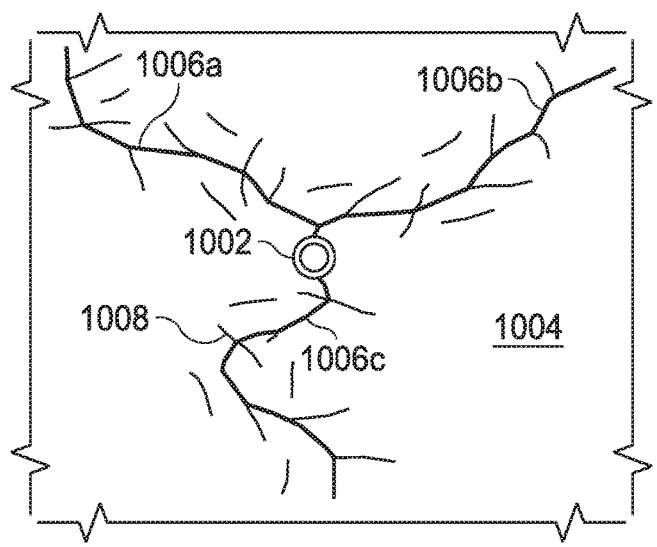
FIG. 10B is a schematic view of another fracture network map.
Figure 10C:
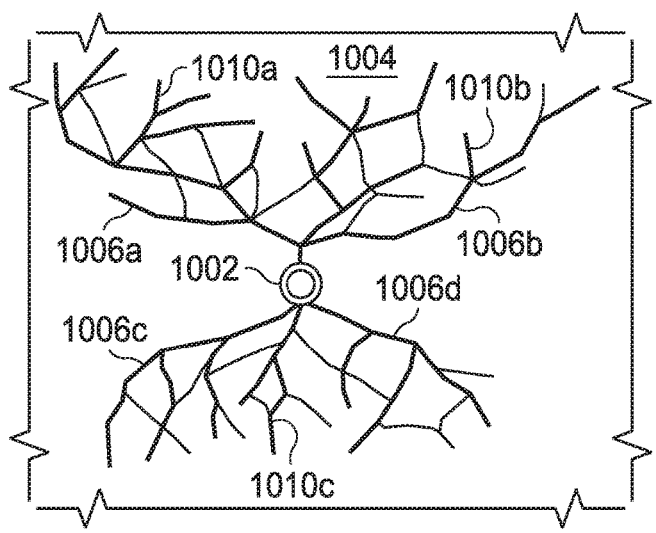
FIG. 10C is a schematic view of another fracture network map.

The relative difference in diffusion coefficients and the diffusion tortuosity (TO measured in the different directions may be evaluated to determine the fracture anisotropic pathways of the subterranean formation 106a and/or subterranean formation 106b. As shown in FIG. 10A-10C, the control system 112 can generate a fracture network map 1000. The fracture network map 1000 maps the complexity of fracture network. The fracture network map 1000 originates with the wellbore 1002 in a subterranean formation 1004. FIG. 10A is an example of a complex fracture network. As shown in FIG. 10A, a major fracture pathway 1006 extends from the wellbore 1002 into the subterranean formation 1004. The major fracture pathway 1006 can intersect the wellbore 1002, as shown in FIG. 10A. Alternatively the major fracture pathway 1006 can have a terminus at the wellbore 1002. Minor fracture pathways 1008 extend from the major fracture pathway 1006.

FIG. 10B is an example of a complex fracture network with major branches. As shown in FIG. 10B, multiple major fracture pathway branches 1006a, 1006b, and 1006c extend from the wellbore 1002 into the subterranean formation 1004. Minor fracture pathways 1008 extend from the major fracture pathway branches 1006a, 1006b, and 1006c into the subterranean formation 1004. FIG. 10C is an example of a complex fracture network with major branches following a hydraulic fracturing operation. As shown in FIG. 10C, multiple major fracture pathway branches 1006a, 1006b, 1006c, and 1006d extend from the wellbore 1002 into the subterranean formation 1004. Minor fracture pathways 1008 have been expanded (and are now not shown in FIG. 10C) into new larger fracture pathways (for example, 1010a, 1010b, and 1010c) which extend from the major fracture pathway branches 1006a, 1006b, and 1006c into the subterranean formation 1004.

The complexity of the fracture network can be closely related to the complexity of formation properties such as the existence of natural fractures and rock mechanical and petro-physical properties. Fractures can be created in the direction of the minimum in-situ stress using fracturing fluids. Hydraulic fracturing of a subterranean formation 1004 can be accomplished in two stages, a pad stage and a slurry stage. In the pad stage, the fracturing fluid is pumped into the subterranean formation 1004 at the target depth in the wellbore 1002 to crack the subterranean formation 1004. In the slurry stage, a mixture of proppant or sand in a blender with the fracturing fluids is injected into the fracture 1004 from the wellbore 1002.

The diffusive tortuosity in each direction may be used to evaluate the anisotropic fracture pathway's length and connections. The comparison of the magnitude and direction of multiple diffusive tortuosities at differing depths indicates the fracture pathway's length and connections (the degree of connectivity) to other fracture pathways within the subterranean formation 106a.

The diffusion tortuosity in each of the directions may be related to the permeability of the subterranean formation 106a. Having permeability in multiple directions (permeability anisotropy) gives a strong indication about the minimum and maximum principal in situ stress of the subterranean formation 106a. The permeability anisotropy increases exponentially with vertically applied stress. The permeability anisotropy can be modelled as shown in Equation 5, where $k_h$ and $k_v$ are the horizontal and vertical permeability respectively, $\sigma_v$ is the effective vertical stress, $\alpha$ and $\beta$ are lithology constants. Diffusive tortuosity ($\tau_d$) would be the least along the fracture main orientation (the lowest diffusive tortuosity of a specific sample from a specific depth in the wellbore) which corresponds to the minimum stress direction.

$$\frac{k_h}{k_v} = \alpha \left(\frac{\sigma_v}{1MPa}\right)^\beta \quad (5)$$

Additionally, in another aspect, the fracture network map of the subterranean formation 106a and/or subterranean formation 106b may be used to design a multi-stage hydraulic fracturing scheme. For example, the less isotropic with lower diffusive tortuosity sections of a horizontal wellbore 104 in an unconventional shale formation may be selected to conduct the hydraulic fracturing operation. In another example, the fracture network map may be used to identify a perforation scheme in a cased hole vertical section of a wellbore by selecting the sections with less tortuous pathways in the horizontal direction proceeding through the subterranean formation 106a and/or 106b. Hydraulic fractures usually are created in the preferential direction determined by the magnitude of the major principal stress in the subterranean formation 106a and/or 106b. Hydraulic fractures tend to be placed in the direction of the minimum stress, hence having the knowledge of the preferential direction of fracture may improve the fracture job design and enhancing the fluid flow in the subterranean formation 106a and/or 106b.

Likewise, in another aspect, the fracture network map of the subterranean formation 106a may be used for predicating a water influx direction and water influx rate of water and fluids flowing into the subterranean formation 106a from a subterranean formation 106c. In this aspect, the subterranean formation 106a is an oil and gas producing formation. Water may flow into the subterranean formation 106c, which is a non-producing (no or insufficient quantities of oil and gas) formation. The connectivity and rate of water influx may be determined from the diffusive tortuosities from locations near and across the subterranean boundaries. For example, if there are two samples, one on each side of the subterranean boundaries, each with low diffusive tortuosities and each direction indicating a flow toward the other, it may be inferred that a connection exists between the two formations allowing a water ingress from the non-producing formation 106c into the producing formation 106a. The rate of flow may be inferred from the low magnitudes of diffusive tortuosities.

In another aspect, a sample of the subterranean formation 106a may be removed from the wellbore 104. A single sample or multiple samples from different depths may be remove from the subterranean formation 106a. Optionally, multiple samples may be removed from subterranean formation 106a and subterranean formation 106b. Measurements of the samples may be taken according to the methods described previously and the diffusive tortuosities in each of the x-direction, the y-direction, and the z-direction.

Figure 3:
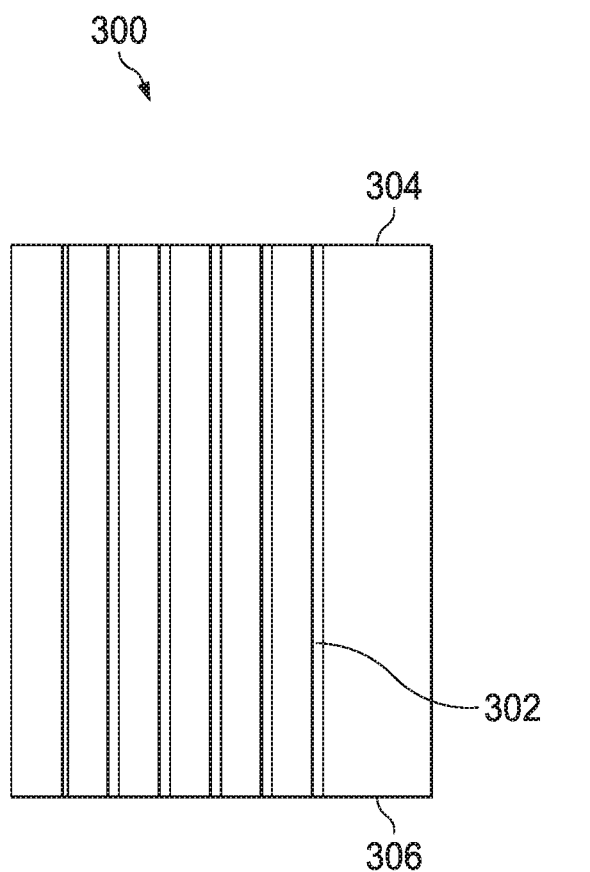
FIG. 3 is a cross-sectional view of a first test sample.
Figure 4:
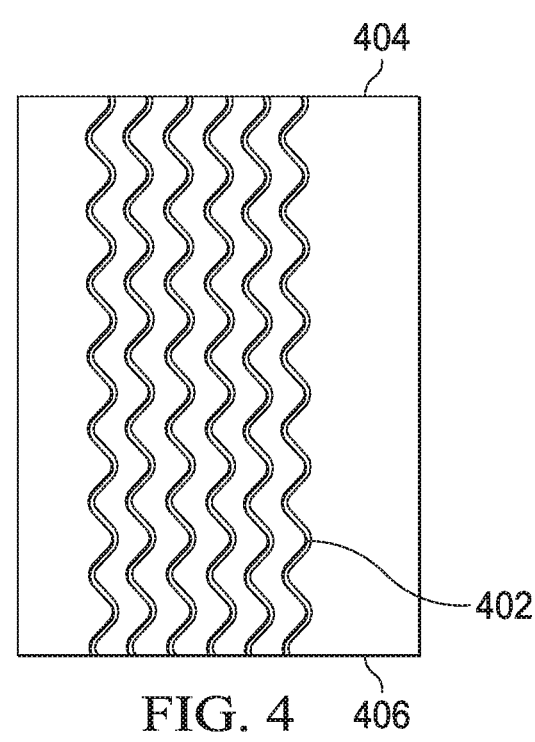
FIG. 4 is a cross-sectional view of a second test sample.

Techniques for determining a fracture geometry according to the present disclosure were experimentally performed. Referring to FIGS. 3 and 4, two three dimensional printed bodies were manufactured to have a cylindrical geometry of two inch in length and one inch in diameter. The first sample body 300, of which a cross section is shown in FIG. 3, has a set of fractures with a straight tube 302 shape (also referred to as a Type S sample). The first sample body 300 has multiple straight tubes 302 extending from a first end 304 of the first sample body 300 to the second end 306 of the first sample body 300. The first sample body 300 straight tubes 302 are configured to allow a fluid to diffuse from the first end 304 to the second end 306. The second sample body 400, of which a cross section is shown in FIG. 4, has a set of fractures with a curved tube 402 shape (also referred to as a Type C sample). The second sample body 400 has multiple curved tubes 402 extending from a first end 404 of the second sample body 400 to the second end 406 of the second sample body 400. The second sample body 400 curved tubes 402 are configured to allow a fluid to diffuse from the first end 404 to the second end 406. The straight tubes 304 are a less tortuous flow path than the curved tubes 402. The first sample body 300 and the second sample body 400 are fabricated with resin. The resin has a negligible signal from low field (close) nuclear magnetic resonance measurement to minimize experiment error from the first sample body 300 and the second sample body 400.

The porosity of first sample body 300 (Type S) is 6.22%. The porosity of the second sample body 400 is 12.10%. Porosity is a petro-physical property that can be used to characterize a porous medium. Porosity reflects the porous medium's capacity to store fluids. Porosity can be an initial indication about the tortuosity of a porous medium. A geometric tortuosity analysis was conducted on the first sample body 300 and the second sample body 400 using a micro computed tomography scanner. The geometric tortuosity of the first sample body 300 was 1.00235. The geometric tortuosity of the second sample body 400 is 1.19269. The first sample body 300 and the second sample body 400 are fully saturated with 3 wt % KCl brine solution.

The pulse field gradient nuclear magnetic resonance signals were generated by a 12.2 MHz nuclear magnetic resonance instrument coupled with a 5.3-cm inner diameter radio frequency coil. The three dimensional ($G_x$, $G_y$, and $G_z$) magnetic field gradients were generated up to 30 G/cm. A 13-interval bipolar gradients pulse sequence using an alternating pulsed field gradient stimulated echo (APFGSTE) was used to avoid unnecessary signal attenuation. This can prevent significant error in the measurements of the restricted diffusion coefficient, $D_r$, due to the susceptibility difference which causes internal magnetic field gradients. The signal attenuation (S/$S_o$) for the 13-interval APGSTE sequence was measured. The results were collected. The restricted diffusion coefficient $D_r$ and diffusion tortuosity were calculated using Equations 1 through 4.

Figure 5:
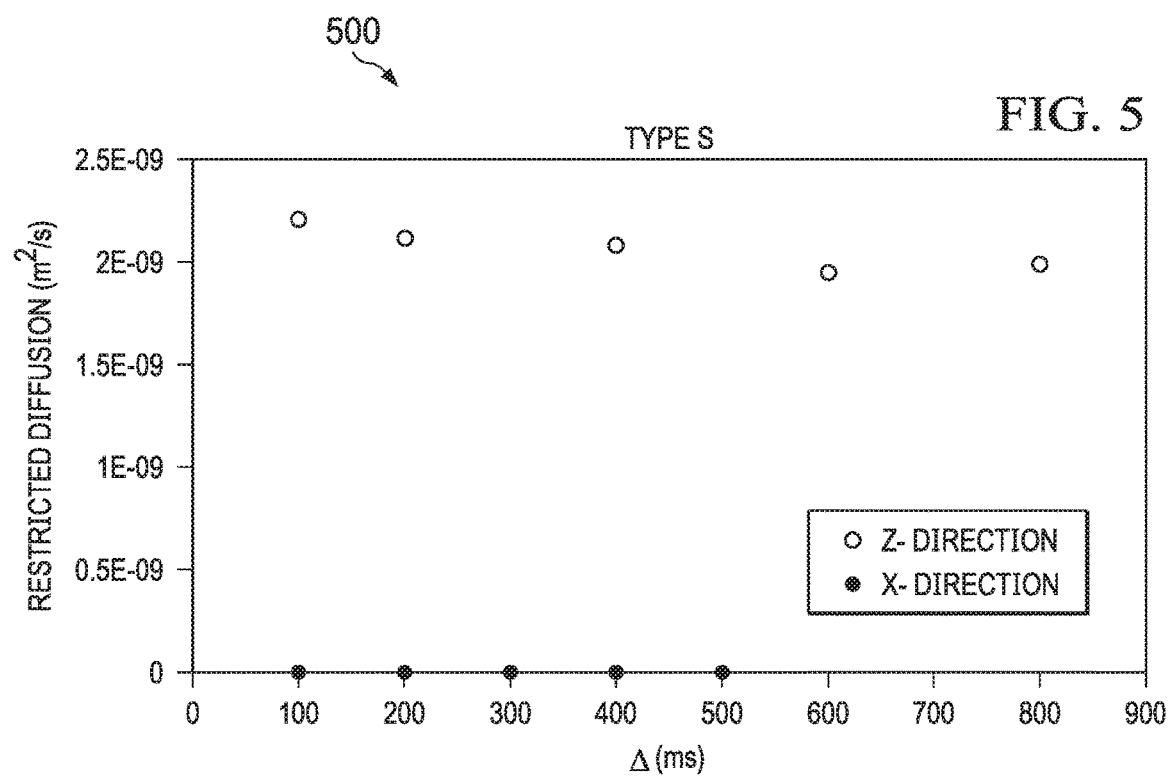
FIG. 5 is a graph of the restricted diffusion coefficient of water as a function of observation time for the first test sample.
Figure 6:
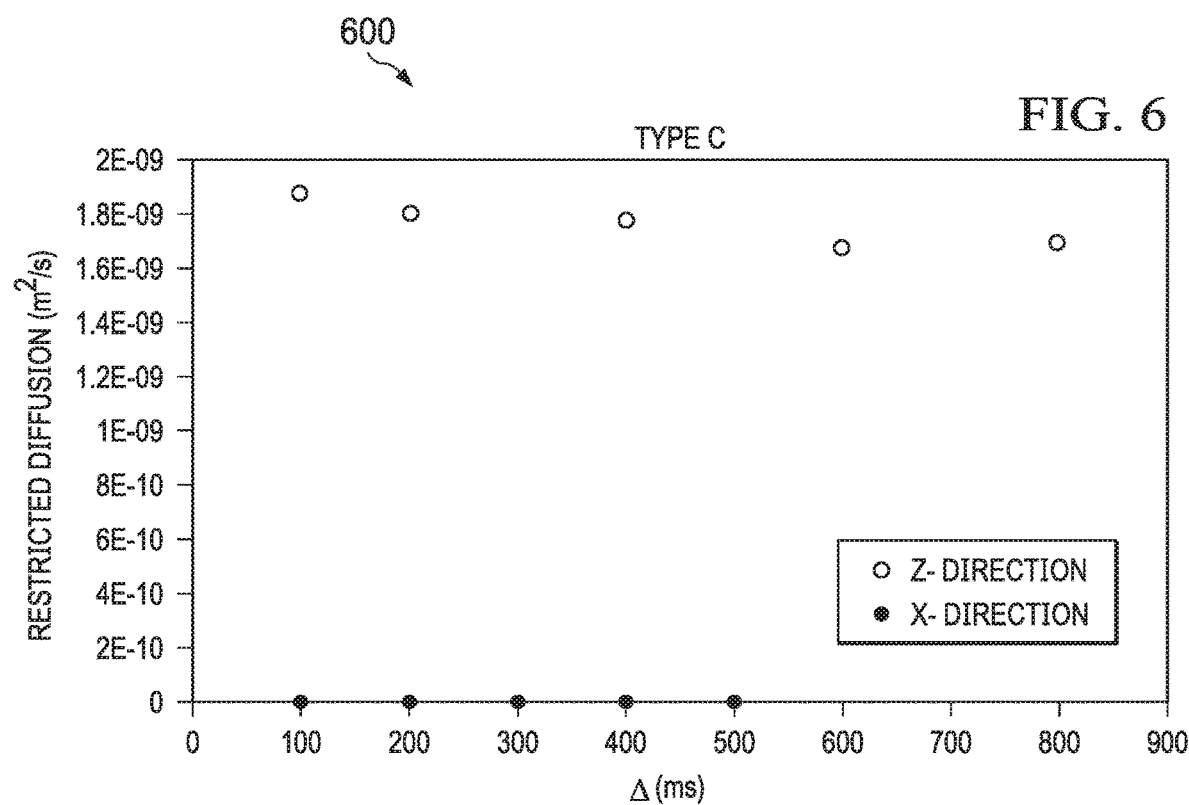
FIG. 6 is a graph of the restricted diffusion coefficient of water as a function of observation time for the second test sample.
Figure 7:
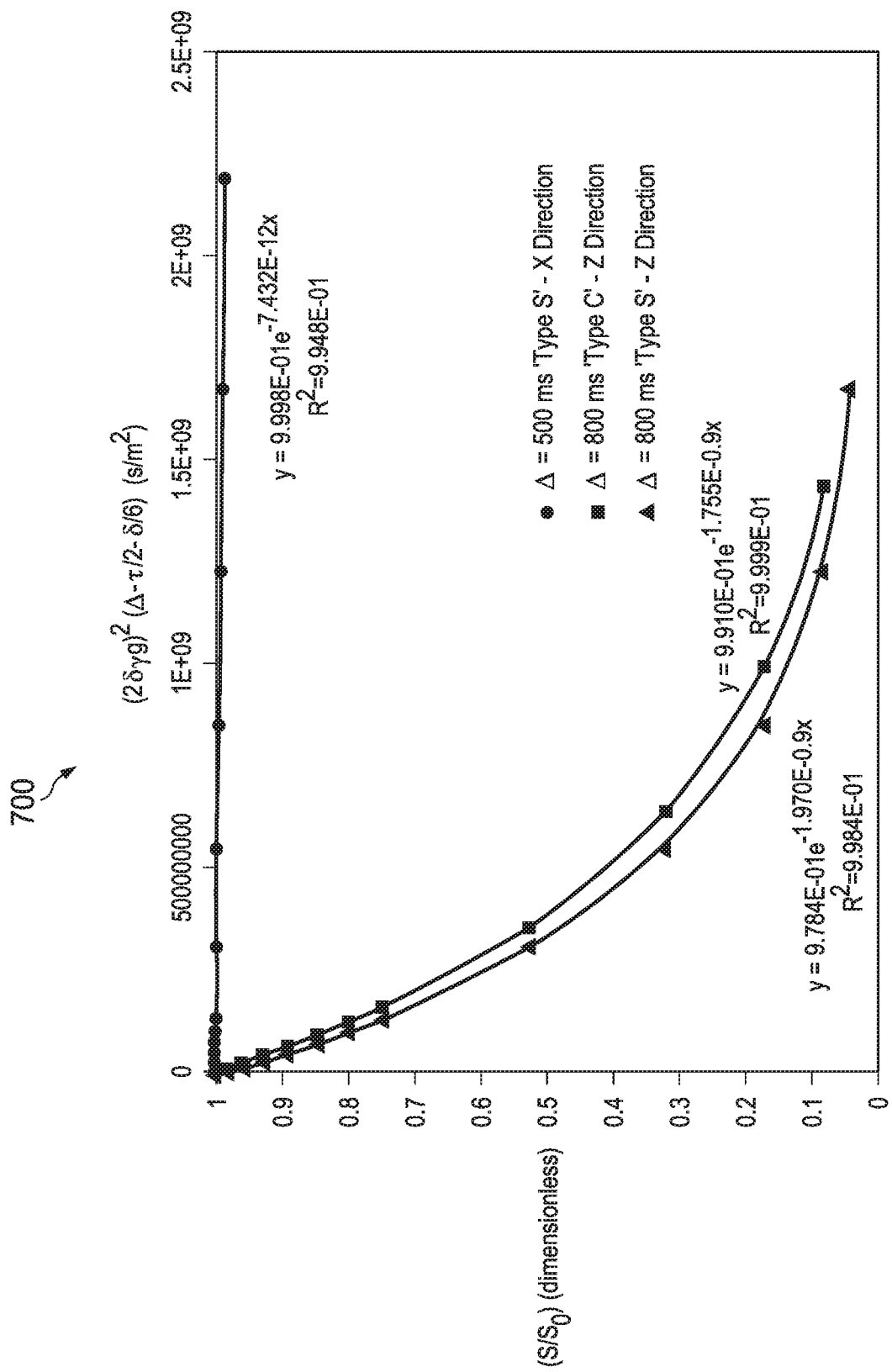
FIG. 7 is a graph of the signal attenuations as a function of gradient strength in X and Z directions for the first sample and the second sample.

The results of the first sample body 300 and the second sample body 400 are shown in FIGS. 5 and 6, respectively. FIGS. 5 and 6 show the restricted diffusion coefficient ($D_r$) as function of observation time. FIG. 7 shows the signal attenuation decay at different direction of applied magnetic field gradient. Fracture tortuosity in the z-direction showed an agreement between the pulsed field gradient nuclear magnetic resonance (PFG NMR) diffusion and Micro CT data as shown in Table 1. The actual diffusion coefficients were not measured in the x-direction because of the restricted regime where the signal attenuation was almost unchanged as function of gradient strength as shown in FIG. 7. This can be explained by the fracture network connectivity as there is no connectivity between fractures in the x direction as shown in FIGS. 3 and 4. The results shown indicate that diffusional tortuosity along the fracture direction increases as geometric tortuosity of the fracture increases. Additionally, the diffusion tortuosity will be the least in the preferential direction of the fracture (the z-direction in this test) while the largest (totally restricted diffusion) perpendicular to the fracture surface orientation in cases of no connectivity between different fractures.

TABLE 1

Tortuosity Test Results

| Sample Name | Geometric Tortuosity (Micro CT) | Diffusion Tortuosity (measured by NMR PFG) in Z-direction |
|---|---|---|
| Sample Body 300 Type S | 1.00235 | 1.1394 |
| Sample Body 400 Type C | 1.19269 | 1.33034 |

Figure 8:
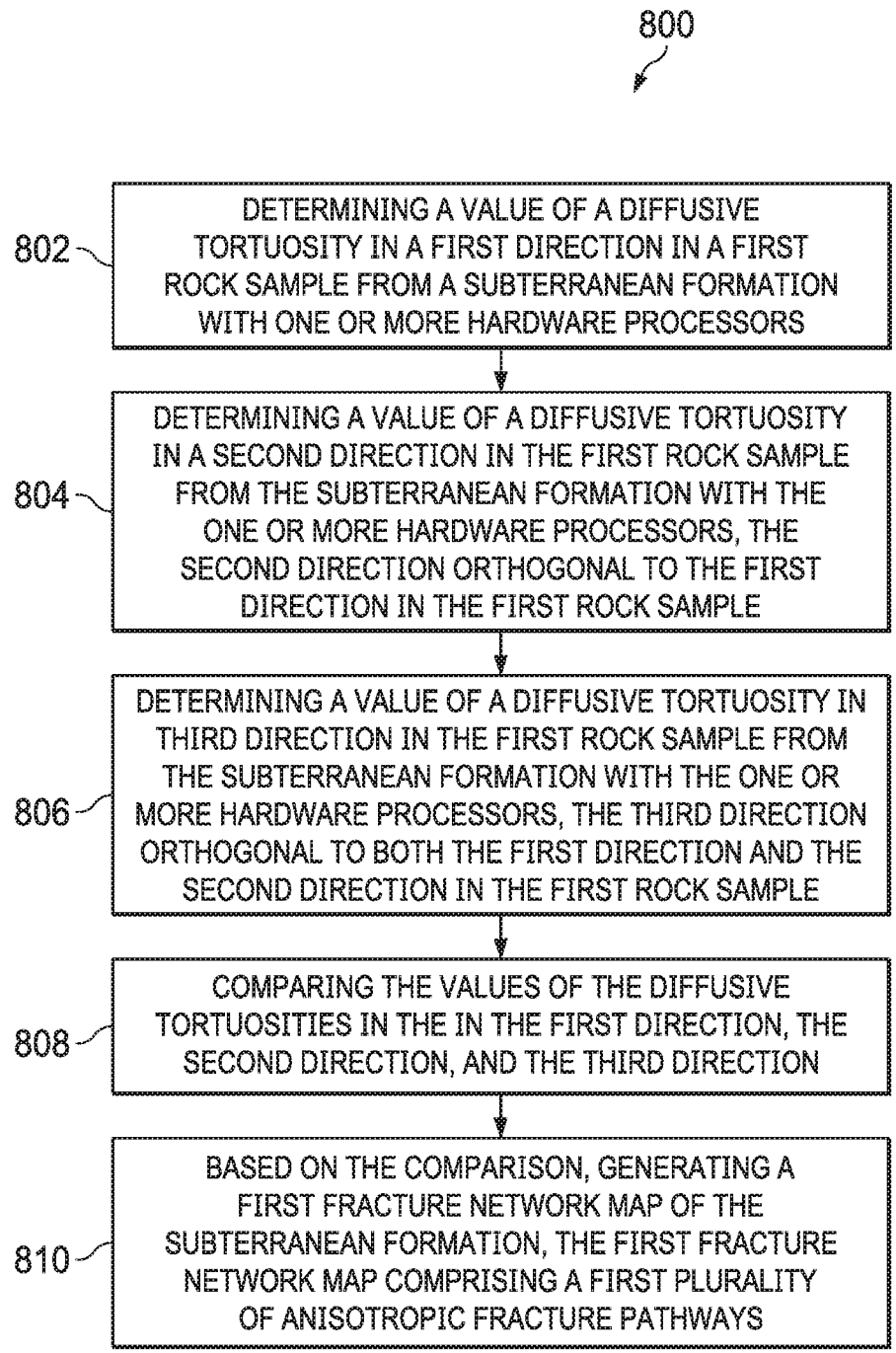
FIG. 8 is a flow chart that describes an example method performed with a fracture geometry mapping system according to the present disclosure.

FIG. 8 illustrates a flow chart of method 800 for an example operation with a downhole tool, such as the downhole tool 102, for mapping a fracture geometry according to the present disclosure. Method 800 may begin at step 802, which includes determining a value of a diffusive tortuosity in a first direction in a first rock sample from a subterranean formation with one or more hardware processors. In some aspects, the diffusive tortuosity is a ratio of a free self-diffusion coefficient of bulk fluid to a restricted effective self-diffusion coefficient of a fluid in a porous media.

Method 800 may continue at step 804, which includes determining a value of a diffusive tortuosity in a second direction in the first rock sample from the subterranean formation with the one or more hardware processors. The second direction is orthogonal to the first direction in the first rock sample.

Method 800 may continue at step 806, which includes determining a value of a diffusive tortuosity in third direction in the first rock sample from the subterranean formation with the one or more hardware processors. The third direction is orthogonal to both the first direction and the second direction in the first rock sample. In some aspects, determining the values of the diffusive tortuosities in the first direction, the second direction, and the third direction further includes generating a pulsed field gradient nuclear magnetic resonance signal in the first direction, the second direction, and the third direction. The pulsed field gradient nuclear magnetic resonance signal may include a 13-interval bi-polar pulsed field gradient stimulated echo. In some aspects, the pulsed field gradient nuclear magnetic resonance signal is generated by a logging tool coupled to a downhole conveyance disposed in the subterranean formation. The downhole conveyance may be a wireline.

In some aspects, the steps of method 800 may include determining multiple diffusive tortuosities at different depths within the wellbore 104. For example, steps 802-806 may be performed where the first rock sample is sampled a first depth from a surface of the Earth and where the second rock sample is sampled at a second depth from the surface of the Earth different that the first depth. A value of a second diffusive tortuosity in a first direction in a second rock sample from the subterranean formation may be determined with the one or more hardware processors. A value of a second diffusive tortuosity in a second direction in the second rock sample from the subterranean formation may be determined with the one or more hardware processors. The second direction is orthogonal to the first direction in the second rock sample. A value of a second diffusive tortuosity in a third direction in the second rock sample from the subterranean formation may be determined with the one or more hardware processors. The third direction is orthogonal to both the first direction and the second direction in the second rock sample. The values of the second diffusive tortuosities are compared in the in the first direction, the second direction, and the third direction. Based on the comparison, a second fracture network map of the subterranean formation at the second depth is generated. The second fracture network map includes multiple second anisotropic fracture pathways. In some aspects, based on the first fracture network map and the second fracture network map, a multi-stage fracturing scheme that includes multiple preferential fracture directions is generated. Each preferential fracture direction is at a different depth than the previous preferential fracture direction.

Method 800 may continue at step 808, which includes comparing the values of the diffusive tortuosities in the in the first direction, the second direction, and the third direction. Method 800 may continue at step 810, which includes based on the comparison, generating a first fracture network map of the subterranean formation. The first fracture network map includes multiple first anisotropic fracture pathways. In some aspects, each of the multiple first anisotropic fracture pathways include a pathway length and a pathway connection. In some aspects, based on the first fracture network map of the subterranean formation, a preferential fracture direction for hydraulic fracturing the subterranean formation may be determined. Alternatively, based on the first fracture network map of the subterranean formation, a water influx direction and water influx rate of water influx into the subterranean formation may be predicated.

Figure 9:
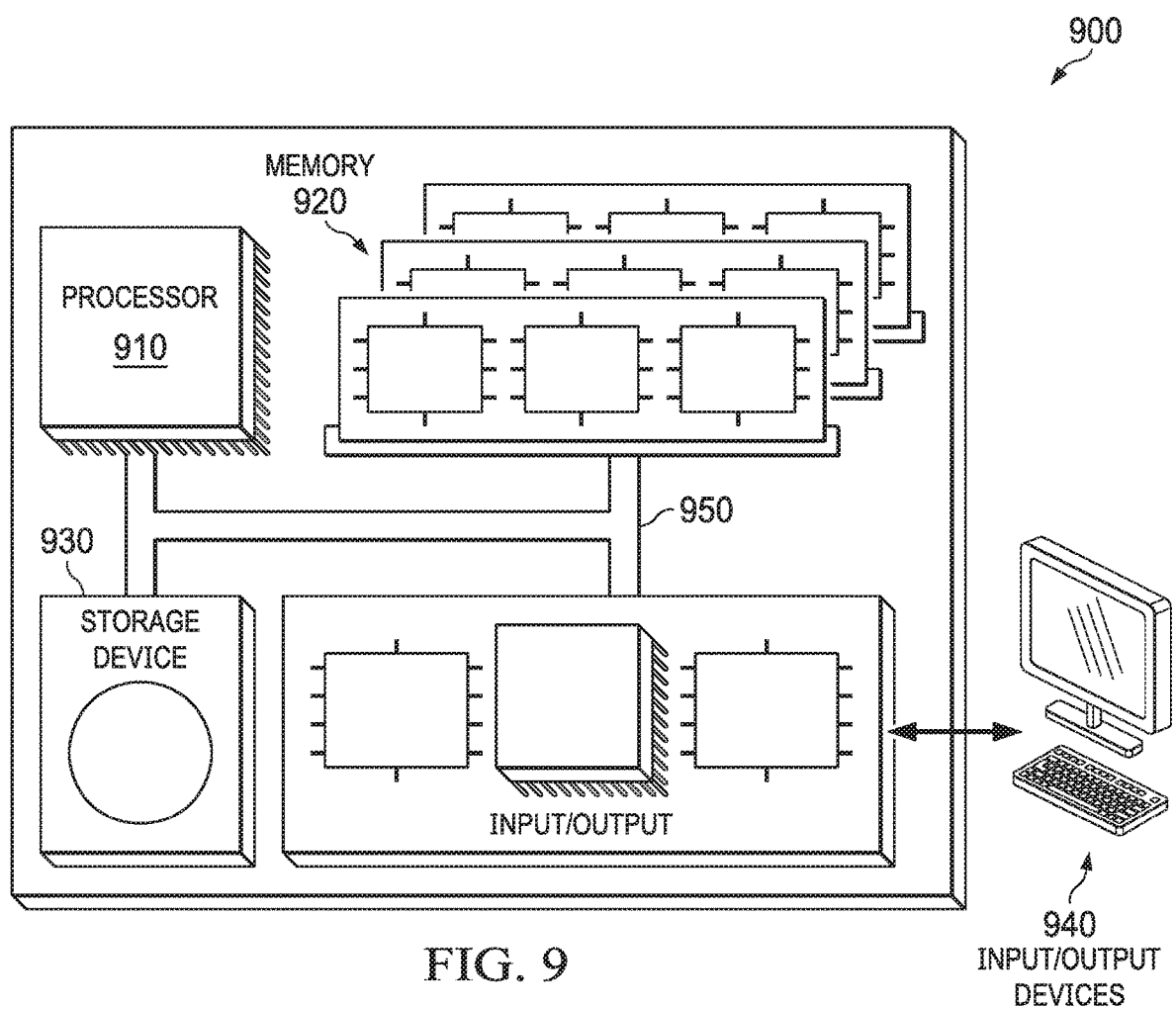
FIG. 9 is a schematic illustration of a control system according to the present disclosure.

FIG. 9 is a schematic illustration of an example controller 900 (or control system) for controlling operations of a fracture geometry mapping system according to the present disclosure. For example, the controller 900 may include or be part of the control system 112 shown in FIG. 1. The controller 900 is intended to include various forms of digital computers, such as printed circuit boards (PCB), processors, digital circuitry, or otherwise parts of a fracture geometry mapping system. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 900 includes a processor 910, a memory 920, a storage device 930, and an input/output device 940. Each of the components 910, 920, 930, and 940 are interconnected using a system bus 950. The processor 910 is capable of processing instructions for execution within the controller 900. The processor may be designed using any of a number of architectures. For example, the processor 910 may be a CISC (Complex Instruction Set Computers) processor, a RISC (Reduced Instruction Set Computer) processor, or a MISC (Minimal Instruction Set Computer) processor.

In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the controller 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the controller 900. In one implementation, the storage device 930 is a computer-readable medium. In various different implementations, the storage device 930 may be a floppy disk device, a hard disk device, an optical disk device, or a tape device.

The input/output device 940 provides input/output operations for the controller 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described previously as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described previously should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A fracture geometry mapping method comprising:
determining a value of a diffusive tortuosity in a first direction in a first rock sample from a subterranean formation with one or more hardware processors;
determining a value of a diffusive tortuosity in a second direction in the first rock sample from the subterranean formation with the one or more hardware processors, the second direction orthogonal to the first direction in the first rock sample;
determining a value of a diffusive tortuosity in a third direction in the first rock sample from the subterranean formation with the one or more hardware processors, the third direction orthogonal to both the first direction and the second direction in the first rock sample;

comparing the values of the diffusive tortuosities in the first direction, the second direction, and the third direction; and based on the comparison, generating a first fracture network map of the subterranean formation, the first fracture network map comprising a first plurality of anisotropic fracture pathways.

2. The method of claim 1, wherein the diffusive tortuosity comprises a ratio of a free self-diffusion coefficient of bulk fluid to a restricted effective self-diffusion coefficient of a fluid in a porous media.

3. The method of claim 1, wherein each of the first plurality of anisotropic fracture pathways comprises:
a pathway length; and
a pathway connection.

4. The method of claim 1, wherein determining the values of the diffusive tortuosities in the first direction, the second direction, and the third direction further comprises generating a pulsed field gradient nuclear magnetic resonance signal in the first direction, the second direction, and the third direction.

5. The method of claim 4, wherein the pulsed field gradient nuclear magnetic resonance signal comprises a 13-interval bi-polar pulsed field gradient stimulated echo.

6. The method of claim 4, further comprising generating the pulsed field gradient nuclear magnetic resonance signal by a logging tool coupled to a downhole conveyance disposed in the subterranean formation.

7. The method of claim 6, wherein the downhole conveyance comprises a wireline.

8. The method of claim 1, further comprising, based on the first fracture network map of the subterranean formation, determining a preferential fracture direction for hydraulic fracturing the subterranean formation.

9. The method of claim 1, further comprising:
determining a value of a second diffusive tortuosity in a first direction in a second rock sample from the subterranean formation with the one or more hardware processors, wherein the first rock sample is sampled a first depth from a surface of the Earth, and wherein the second rock sample is sampled at a second depth from the surface of the Earth different that the first depth;
determining a value of a second diffusive tortuosity in a second direction in the second rock sample from the subterranean formation with the one or more hardware processors, the second direction orthogonal to the first direction in the second rock sample;
determining a value of a second diffusive tortuosity in a third direction in the second rock sample from the subterranean formation with the one or more hardware processors, the third direction orthogonal to both the first direction and the second direction in the second rock sample;
comparing the values of the second diffusive tortuosities in the first direction, the second direction, and the third direction;
based on the comparison, generating a second fracture network map of the subterranean formation at the second depth, the second fracture network map comprising a second plurality of anisotropic fracture pathways; and
based on the first fracture network map and the second fracture network map, generating a multi-stage fracturing scheme that comprises a plurality of preferential fracture directions, each preferential fracture direction at a different depth than the previous preferential fracture direction.

10. The method of claim 1, further comprising, based on the first fracture network map of the subterranean formation, predicating a water influx direction and water influx rate of water influx into the subterranean formation.

11. A system comprising:
one or more computer processors;
a non-transitory computer-readable storage medium storing instructions executable by the one or more computer processors to cause the one or more computer processors to perform operations comprising:
identifying a signal representing a value of a diffusive tortuosity in a first direction in a first rock sample from a subterranean formation;
identifying a signal representing a value of a diffusive tortuosity in a second direction in the first rock sample from the subterranean formation, the second direction orthogonal to the first direction in the first rock sample;
identifying a signal representing a value of a diffusive tortuosity in a third direction in the first rock sample from the subterranean formation, the third direction orthogonal to both the first direction and the second direction in the first rock sample;
comparing the values of the diffusive tortuosities in the first direction, the second direction, and the third direction; and
based on the comparison, generating a first fracture network map of the subterranean formation, the first fracture network map comprising a first plurality of anisotropic fracture pathways.

12. The system of claim 11, wherein the operations further comprise, based on the first fracture network map of the subterranean formation, further determining a preferential fracture direction for hydraulic fracturing the subterranean formation.

13. The system of claim 11, wherein the operations further comprise:
identifying a value of a second diffusive tortuosity in a first direction in a second rock sample from the subterranean formation, wherein the first rock sample is sampled a first depth from a surface of the Earth, and wherein the second rock sample is sampled at a second depth from the surface of the Earth different that the first depth;
identifying a value of a second diffusive tortuosity in a second direction in the second rock sample from the subterranean formation, the second direction orthogonal to the first direction in the second rock sample;
identifying a value of a second diffusive tortuosity in a third direction in the second rock sample from the subterranean formation, the third direction orthogonal to both the first direction and the second direction in the second rock sample;
comparing the values of the second diffusive tortuosities in the first direction, the second direction, and the third direction;
based on the comparison, generating a second fracture network map of the subterranean formation at the second depth, the second fracture network map comprising a second plurality of anisotropic fracture pathways; and
based on the first fracture network map and the second fracture network map, generating a multi-stage fracturing scheme that comprises a plurality of preferential fracture directions, each preferential fracture direction at a different depth than the previous preferential fracture direction.

14. The system of claim 11, wherein the operations further comprise, based on the first fracture network map of the subterranean formation, further predicating a water influx direction and water influx rate of water influx into the subterranean formation.

15. The system of claim 11, further comprising a pulsed field gradient nuclear magnetic resonance tool configured to perform operations comprising:
   generating the signal representing a value of a diffusive tortuosity in a first direction in the first rock sample from the subterranean formation;
   transmitting the signal representing the value of the diffusive tortuosity in the first direction to the one or more computer processors;
   generating the signal representing the value of the diffusive tortuosity in the second direction in the first rock sample;
   transmitting the signal representing the value of a diffusive tortuosity in a second direction to the one or more computer processors;
   generating the signal representing the value of the diffusive tortuosity in a third direction in the first rock sample; and
   transmitting the signal representing the value of the diffusive tortuosity in the second direction to the one or more computer processors.

16. The system of claim 11, wherein the diffusive tortuosity comprises a ratio of a free self-diffusion coefficient of bulk fluid to a restricted effective self-diffusion coefficient of a fluid in a porous media.

17. The system of claim 11, wherein each of the first plurality of anisotropic fracture pathways comprises:
   a pathway length; and
   a pathway connection.

18. The system of claim 15, wherein the operation of determining the values of the diffusive tortuosities in the first direction, the second direction, and the third direction further comprises generating a pulsed field gradient nuclear magnetic resonance signal in the first direction, the second direction, and the third direction.

19. The system of claim 18, wherein the pulsed field gradient nuclear magnetic resonance tool is configured to generate a 13-interval bi-polar pulsed field gradient stimulated echo signal.

20. The system of claim 18, wherein the pulsed field gradient nuclear magnetic resonance tool is coupled to a downhole conveyance disposed in the subterranean formation and configured to generate a pulsed field gradient nuclear magnetic resonance signal.

21. The system of claim 20, wherein the downhole conveyance comprises a wireline.

* * * * *